Jan. 27, 1959 W. L. STEINBARGE 2,871,416
RACK FOR POLE-MOUNTED CAPACITORS AND THE LIKE
Filed May 16, 1955 3 Sheets-Sheet 1
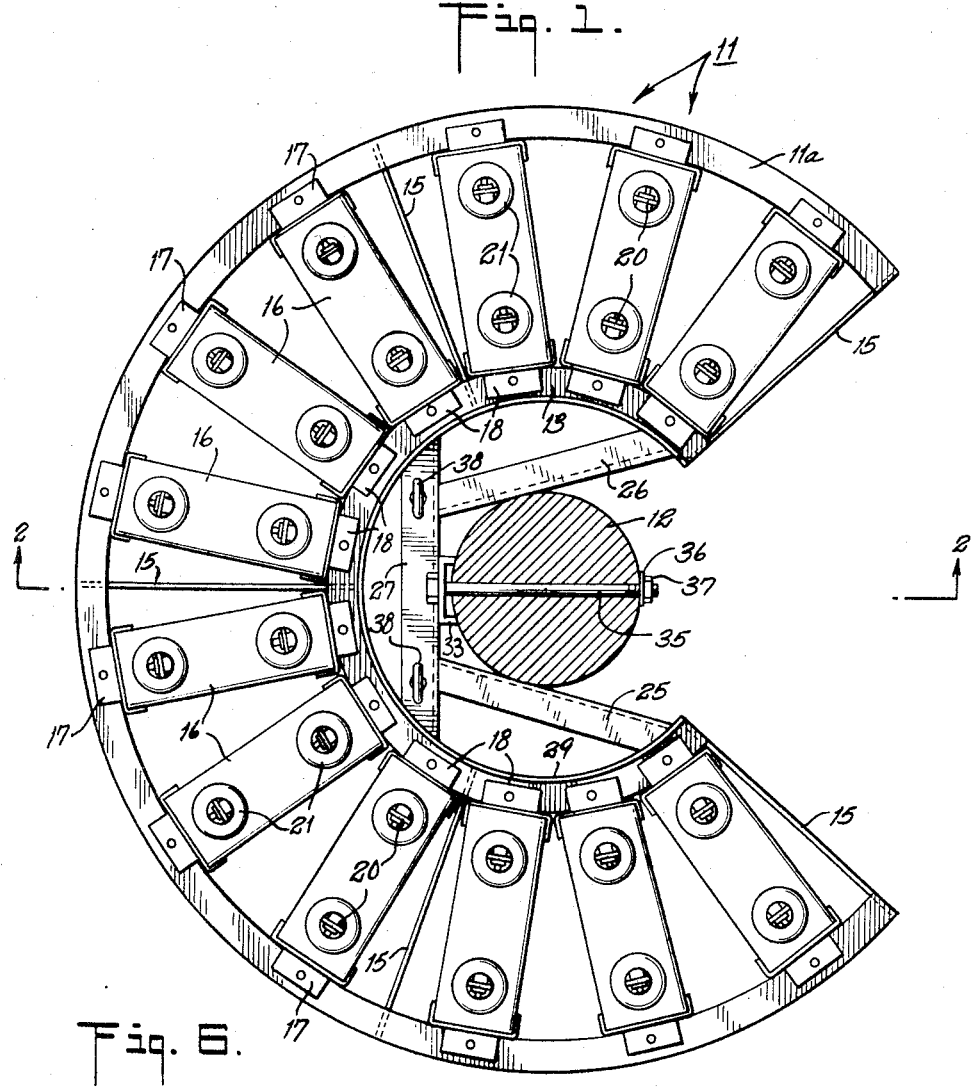
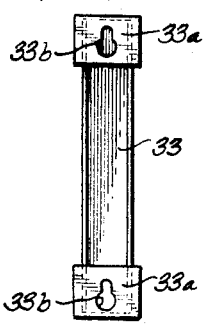
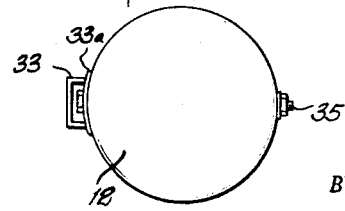
INVENTOR.
WAYNE L. STEINBARGE
BY W. D. Keith,
ATTORNEY

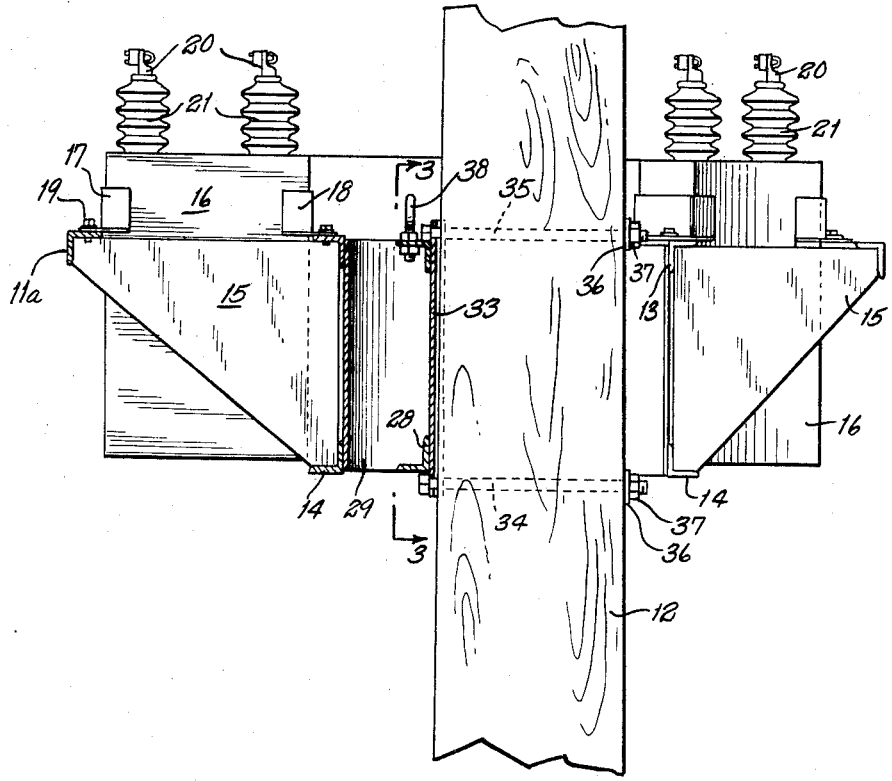

Jan. 27, 1959 W. L. STEINBARGE 2,871,416
RACK FOR POLE-MOUNTED CAPACITORS AND THE LIKE
Filed May 16, 1955 3 Sheets-Sheet 3

INVENTOR.
WAYNE L. STEINBARGE
BY W. D. Keith,
ATTORNEY

United States Patent Office 2,871,416
Patented Jan. 27, 1959

2,871,416

RACK FOR POLE-MOUNTED CAPACITORS AND THE LIKE

Wayne L. Steinbarge, South Plainfield, N. J., assignor to Cornell-Dubilier Electric Corporation, South Plainfield, N. J., a corporation of Delaware Application May 16, 1955, Serial No. 508,460

11 Claims. (Cl. 317—99)

This invention is concerned with a rack. More specifically, the rack according to this invention is one particularly adapted for carrying capacitors on a pole.

In power factor correction for public and private utilities, commercial plants and the like, one method employed uses fixed capacitors having sufficient capacity and voltage rating for the substantial power circuits involved. It has been found that one of the most convenient and economical mountings for such capacitors is a rack that supports a group of the capacitors mounted on a pole outdoors as near as possible to the load center. In this manner, in the case of a commercial plant, the group or bank of capacitors may be installed after a plant is already in construction and operating. Also, such location is the logical one for correcting the power factor at the source for an entire plant.

However, in the racks which have been heretofore employed in connection with such banks of capacitors, the capacitors were arranged in a rectangular manner, i. e. in line, or in several lines, side by side, or in groupings of rectangular forms. The rack which supported such a group of capacitors was mounted in various ways on a power line pole, but most always of necessity the entire bank of capacitors were situated on one side only of the pole.

Consequently, in view of the above situation with regard to the construction of racks employed for capacitor banks, an improved rack according to this invention provides a number of improvements among which are the following objects of this invention. Thus, it is an object of this invention to provide an arrangement of capacitors situated together in a bank which presents a minimum of capacitor wall area being subjected to a sun load. In other words, the deleterious effect of the heating and weathering due to the sun's rays are kept to a minimum by the use of a rack according to this invention.

Another object of this invention is to provide an angular relationship between adjacent capacitors which will reduce the reradiation of heat from one capacitor to the next, which heat has been created due to internal power losses.

Another object of this invention is to provide improved weight distribution of the bank of capacitors as mounted on their rack. Such weight distribution includes various benefits and corollary effects among which are the following: A reduced wind loading since the minimum of a flat surface is presented in any given direction; a reduced moment arm of the various centers of mass of the bank of capacitors which are acting normally to the axis of the pole; an increased safety factor for earthquake loading, which factor is called for in many installations; and finally a reduced ice loading is created since the addition of ice load to any bank of capacitors is most beneficially distributed by means of a rack constructed according to this invention.

Another object of this invention is to provide a rack of capacitor units which is more efficient in the space consumption over a group of capacitors arranged in a single line.

Another object of this invention is to provide a grouping of capacitors which has a symmetrical arrangement that is particularly beneficial in connection with a Y-connected bank of capacitors. In this same connection, the symmetrical arrangement provides a maximum clearance from one phase of the power line to the next and thus reduces to a minimum the possibility of a phase-to-phase fault.

Another object of this invention is to provide a unit having the minimum separate or lose parts included with the unit for shipping. The rack according to this invention needs merely the two bolts for mounting the rack on a pole, that are extra parts included with the rack as shipped.

Another object of this invention is to provide a rack having wedge-like braces included in the construction thereof, such that poles having the usual different sizes in exterior diameter may be readily accommodated without any structural change in the rack. Thus an entire range of standard-sized poles may be accommodated by a single rack constructed according to this invention.

Still another object of this invention is to provide a compact, all welded, relatively light weight unit for accommodating a bank of power factor correction capacitors, which is at the same time quite simple to replace for repair purposes and the like.

These and other objects and benefits of the invention will be more fully set forth below and described in connection with the drawings wherein like reference numbers refer to like parts throughout.

Briefly, the invention is concerned with a rack for pole-mounted capacitors and the like. The rack includes an arcuate-shaped frame that has an opening therein to admit a pole into the center thereof. In addition, said frame includes inner and outer concentric supports for a plurality of capacitors to be situated radially relative to the centerline of the pole.

In the drawings:

Fig. 1 is a plan view of a rack according to this invention with a bank of capacitors mounted thereon;

Fig. 2 is a vertical cross-section taken along the line 2—2 of Fig. 1;

Fig. 3 is a detail view taken along the line 3—3 of Fig. 2, showing the attachment of the pole;

Fig. 6 is a plan view of an alternative style mounting element; and

Fig. 7 is an elevation of the same alternative style mounting element.

Figure 4:
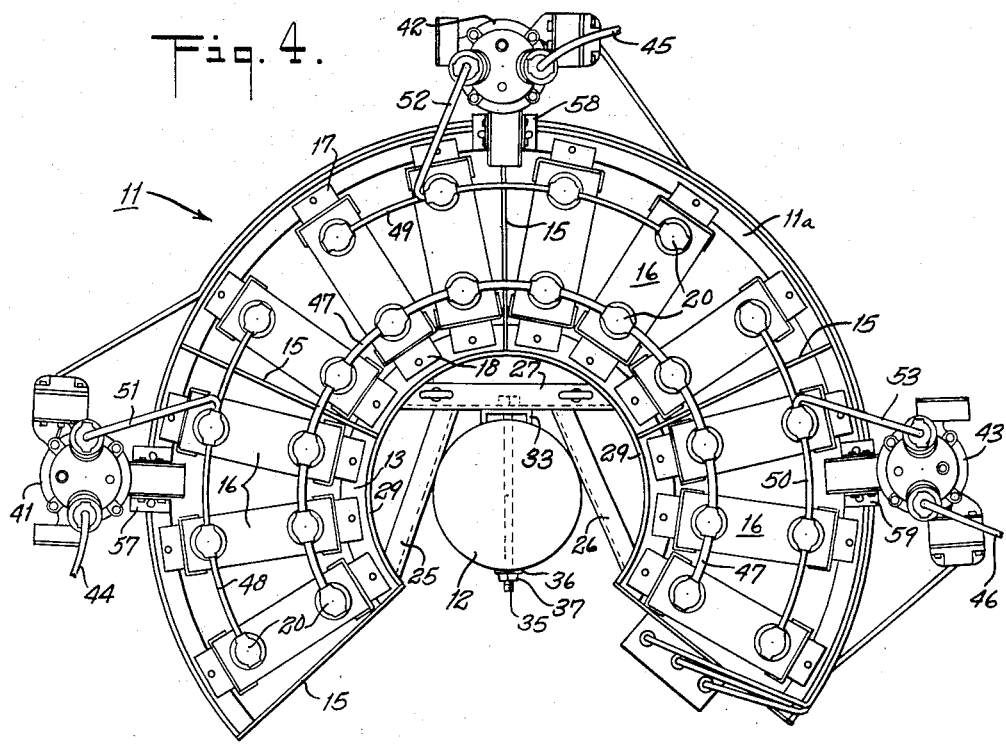
Fig. 4 is a plan view of the rack including switches mounted thereon and showing the wiring for a Y-connection to the line.
Figure 5:
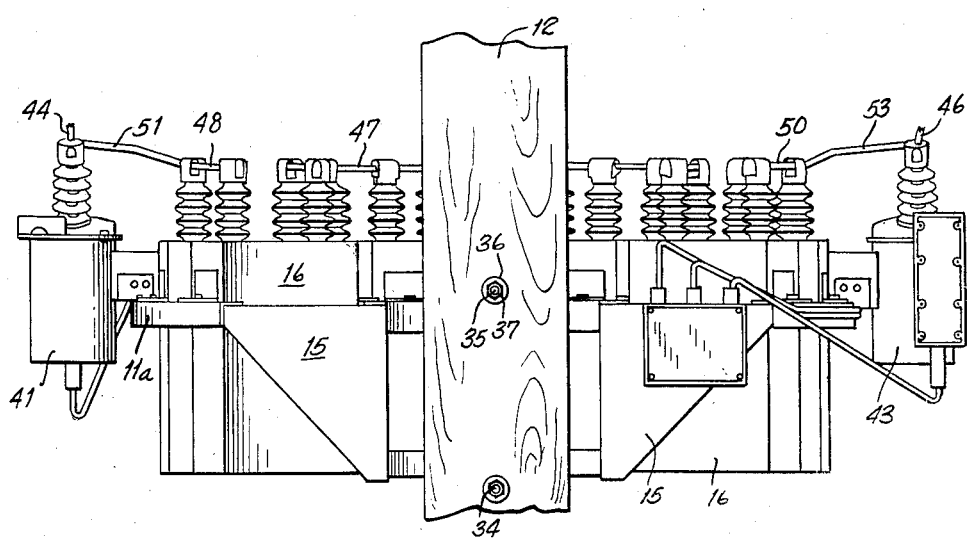
Fig. 5 is a front elevation of the rack with switches mounted and wired for Y connections as shown in Fig. 4.

A rack according to this invention is illustrated in Figs. 1–3 showing a bank of capacitors mounted in place thereon, and the same rack is illustrated in Figs. 4 and 5 showing additional elements mounted thereon for providing a switching arrangement to change the power factor correction with changing loads. In addition, Figs. 4 and 5 illustrate the physical arrangement of the connection of the bank of capacitors to the line wires.

Referring to Fig. 1, it will be observed that the rack is constructed of a framework 11 that includes an outer support member 11a that is circular and extends about three quarters of the way around a pole 12, upon which the rack is supported. The framework 11 also includes an inner support member 13 that is also circular and that is concentric with the outer support member 11a. In addition, there is another inner support member 14 (see Fig. 2) that is entirely similar to inner support member 13, and is located vertically spaced below member 13 and concentric therewith. Fastening the three support members together, there is a plurality of radially-situated panels 15 which are welded or otherwise securely attached to all three of the support members 11a, 13 and 14. The support members 11a, 13 and 14 may take various forms, but it is preferred to employ angle members having a right angle cross-section like that clearly illustrated in Fig. 2. The panels 15 divide the rack into equal-sized sectors, as clearly shown in Fig. 1, and each sector may accommodate three capacitors 16 therein. The capacitors are a standard unit which are so constructed as to have generally rectangular housing and include brackets 17 and 18 on either end of each capacitor. Thus each capacitor 16 is mounted on the rack by means of the brackets 17 and 18 as well as bolts 19 (Fig. 2) which may be threadedly received in holes located at spaced intervals around the support members 11a and 13, as clearly illustrated. Each capacitor 16 has a pair of terminal connectors 20 that are located at the upper extremity of high voltage insulators 21.

It will be appreciated that other and different styles of capacitors might be employed such that the mounting arrangement on the rack might vary somewhat. For the same reason, the location, configuration and number of the panels 15 would be varied to suit the particular capacitors mounted. Also, the capacitors may be of a type employing only one terminal connector 20 mounted at the extremity of its insulator 21.

In addition to the framework structure described so far, the rack includes an upper pair of converging crossbraces 25 and 26. These braces are welded, or similarly securely attached, to the upper support member 13 and are situated across the circle formed by support member 13 as chords thereof. At the inner extremity of crossbraces 25 and 26 they are welded, or otherwise securely attached, to a third crossbrace 27 that also lies as a chord of the circle formed by inner support member 13.

Referring to Fig. 2 it will be noted that there are similar crossbraces situated below braces 25, 26 and 27 that are welded in the same way to the lower inner support member 14. In Fig. 2 only the third crossbrace, i. e. a crossbrace 28, is visible. Additional structure making up the framework 11 of the rack includes a metal cylindrical heavy gauge sheet material portion 29, to which the inner support members 13 and 14, as well as all of the crossbraces, are welded.

It is to be noted that the pole 12 becomes wedged between the converging braces 25 and 26 and the corresponding lower braces (not visible). In order to accommodate a wider range of pole sizes, the braces might include an integrally attached, but sliding and adjustable take-up arrangement (not shown) to insure the maximum benefit of the wedging action.

For fastening the entire rack in place on the pole 12 there is a vertical channel bar 33 (Fig. 3) which is centrally located on the crossbraces 27 and 28, and is securely attached thereto, e. g. by welding. At the upper and lower extremities of channel 33 there are holes to accommodate a pair of bolts 34 and 35 which pass directly through holes drilled in the pole 12. These holes are preferably located across the maximum diameter of the pole 12 so as to intersect the centerline thereof. In conjunction with the bolts 34 and 35 there are washers and nuts 36 and 37 respectively.

For handling the rack in mounting and dismounting the same on the pole 12, there is a pair of eye bolts or rings 38 which are bolted in place through the top of the crossbrace 27 equidistant from the center thereof as clearly illustrated in Figs. 2 and 3.

In Figs. 4 and 5, the rack according to this invention is illustrated with switches mounted thereon in addition to the capacitors 16, and also illustrating the wiring for connecting a group of twelve capacitors in a Y-connection to the line. It will be noted that there are three switches 41, 42 and 43 that are attached to the outer support member 11a of the rack, and symmetrically situated around the pole 12 so as to provide a maximum spacing between three lead wires 44, 45 and 46 which will extend to the three line wires of a three-phase power supply. Furthermore, it is to be noted that the innermost row of terminal connectors 20 of the capacitors 16 are connected in common, by a single continuous wire 47. The outermost terminal connectors 20 are connected in three groups of four by means of three wires or cables 48, 49 and 50. Each such group of four connected terminals is in turn electrically connected to one of the terminals of each of the switches 41, 42 and 43 by means of relatively short, directly-connected wires 51, 52 and 53. It will be noted that the switches 41, 42 and 43 are readily attached to the rack by means of any convenient type of bracket, e. g. brackets 57, 58 and 59.

It is pointed out that by means of a rack according to this invention the electrical connection necessary for Y-connecting a group of capacitors to a three-phase power line may be most advantageously effectuated. This will be readily evident upon reference to Figs. 4 and 5 where it will be noted that the spacing of all wires that are related to each of the three phases is maintained at a maximum. In this manner the chances of having a phase-to-phase electrical breakdown, or fault, is maintained at a minimum. In addition, the connection is particularly well adapted for a Y-connection in that the neutral wire or circuit may be maintained with the closest spacing between adjacent terminals of the capacitors while employing a minimum amount of connecting cable or wire to join these terminals.

It will be appreciated that a rack according to this invention could also be employed with various other types of connections, e. g. delta, single phase or two phase connections.

While there has been disclosed an embodiment of the invention in some detail in accordance with the applicable statutes, this is not to be taken as in any way limiting the scope of the invention, but merely as being descriptive thereof.

It is claimed:

1. A rack for pole-mounted capacitors and the like comprising an arcuate-shaped frame including an opening therein to enable the frame to be disposed in surrounding relation to said pole by lateral translation thereof, said frame including inner and outer concentric supports for a plurality of capacitors to be secured thereto in radial relation relative to the centerline of the pole, a pair of chordal braces secured to said inner support and disposed in inwardly converging relation from the opening for receiving the pole therebetween and means for maintaining said chordal braces in compressive engagement with said pole surface.

2. A rack for pole-mounted capacitors and the like comprising a frame having a geometric shape for distributing the total load around the pole, said frame including inner and outer concentric supports for receiving said capacitors situated radially around the pole between the inner and outer supports, an opening in said frame for enabling the rack to be placed on the pole with the concentric supports surrounding the pole by a lateral translation of the rack, a pair of crossbraces on said frame situated in a converging relation from said opening, and means centrally located between said converging braces for supporting the rack from the pole by wedging the pole in the opening.

3. A rack for pole-mounted capacitors and the like comprising an arcuate-shaped frame for distributing the total load around the pole, said frame including inner and outer concentric supports for receiving said capacitors situated radially around the pole between the inner and outer supports, an opening in said frame for enabling the rack to be placed on the pole with the concentric supports surrounding the pole by a lateral translation of the rack, a pair of chordal crossbraces on said frame situated in a converging relation from said opening, and means centrally located between said converging braces for supporting the rack from the pole by wedging the pole in the opening.

4. A rack for pole-mounted capacitors and the like comprising an arcuate-shaped frame extending over more than one hundred and eighty degrees for distributing the total load around the pole, said frame including inner and outer concentric supports for receiving said capacitors situated radially around the pole between the inner and outer supports, an opening in said frame for enabling the rack to be placed on the pole with the concentric supports surrounding the pole by a lateral translation of the rack, a pair of chordal crossbraces on said frame situated in a converging relation from said opening, a third chordal crossbrace being attached to the extremity of said pair of braces opposite to said opening, and means centrally located between said converging braces for supporting the rack from the pole by wedging the pole in the opening.

5. A rack for pole-mounted capacitors and the like comprising an arcuate-shaped frame extending over more than one hundred and eighty degrees for distributing the total load around the pole, said frame including inner and outer concentric supports for receiving said capacitors situated radially around the pole between the inner and outer supports, an opening in said frame for enabling the rack to be placed on the pole with the concentric supports surrounding the pole by a lateral translation of the rack, a pair of chordal crossbraces on said frame situated in a converging relation from said opening, a third chordal crossbrace being attached to the extremity of said pair of braces opposite to said opening, and at least one bolt located centrally between said converging braces and adapted to pass through the pole for supporting the rack thereon and to wedge the pole securely between the pair of converging braces.

6. A rack for pole-mounted capacitors and the like comprising an arcuate-shaped frame extending over about two hundred and seventy degrees of arc, said frame including inner and outer concentric supports for receiving said capacitors situated radially around the pole between the inner and outer supports, an additional inner support spaced vertically from said first-named inner support, a plurality of laterally-extending connecting means for joining said supports, an opening in said frame for enabling the rack to be placed on the pole with the concentric supports surounding the pole by a lateral translation of the rack, two pairs of chordal crossbraces on said frame, one pair connected to each of said inner supports and each pair situated in a converging relation from said opening, a third chordal crossbrace being attached to the extremity of each of said pairs of braces opposite to said opening, and a pair of bolts adapted to be attached to said third chordal crossbraces centrally between said converging pairs of crossbraces and adapted to pass through said pole at about an intersecting relation with the centerline of the pole.

7. A pole-type rack for a group of capacitors or the like comprising a frame having inner and outer supporting members situated in radial coplanar spaced relation and at least partly surrounding said pole, and a pair of diverging braces secured to said inner supporting member for strengthening the frame, said braces providing a wide-mouth opening for receiving the pole therein by lateral translation of said rack, said supporting members being adapted to receive and support a plurality of capacitors disposed in radial spaced relationship relative to the centerline of said pole.

8. A pole-type rack for a group of capacitors or the like comprising a frame having inner and outer circularly shaped supporting members situated in concentric coplanar relationship and spaced a given radial distance apart, said frame also including a second inner supporting member spaced vertically from said first-named inner supporting member and laterally situated structural members for joining all said supporting members to form the frame, said frame and members extending more than half-way around the pole, a pair of diverging braces secured to said first inner supporting member to strengthen said frame and to provide a wide-mouthed opening to receive the pole therebetween by lateral translation of said frame and means for mounting said braces in compressive supporting engagement with said pole surface, said supporting members being adapted to receive and support a plurality of capacitors disposed fan-like around said pole.

9. A pole-type rack for a group of capacitors or the like comprising a frame having inner and outer circular supporting members situated concentrically and being a given radial distance apart, said frame also including a second inner supporting member spaced vertically from said first-named inner supporting member and laterally situated structural members for joining all said supporting members to form the frame, said frame and members extending approximately three quarters of the way around the pole, two pairs of diverging braces on said frame located radially within said inner supporting members and spaced vertically apart in conjunction with said inner supporting members, said braces providing a wide-mouth opening for receiving the pole therein, said supporting members being adapted to receive and support a plurality of capacitors disposed radially around said pole, and means for additionally supporting a plurality of accessories on said frame spaced centrally of three groups of capacitors to provide maximum spacing in three-phase power connections.

10. A pole-type rack for a group of capacitors or the like comprising a frame having inner and outer circular supporting members situated concentrically and being a given radial distance apart, said frame also including a second inner supporting member spaced vertically from said first-named inner supporting member and radially situated partitions for structurally joining all said supporting members to form the frame, said frame and members extending approximately three quarters of the way around the pole, two pairs of diverging braces on said frame spaced vertically apart in conjunction with said inner supporting members, said braces providing a wide-mouth opening for receiving the pole therein, an additional brace for each inner supporting member lying across a chord of the circle and joining the inner extremities of said pairs of braces, means for additionally supporting a plurality of switches on said frame spaced centrally of each of three groups of capacitors to provide maximum spacing in three-phase power connections, and means for supporting the rack on the pole including bolts for passing through holes transversely located through the pole.

11. A support rack for pole-mounted electrical instrumentalities comprising first and second arcuately shaped frame members sized to be disposed in concentric surrounding relation to a pole and remote from the surface thereof, a third frame member disposed concentric to and coplanar with said first frame member and radially spaced therefrom a distance sufficient to accommodate an electrical instrumentality disposed intermediate thereof and secured thereto, bracing means secured to said first, second and third frame members to maintain the same in predetermined spatial load supporting relation and means disposed within said first and second frame members and secured thereto for affixing said rack to a pole with the plane of said first and third frame members being disposed substantially perpendicular to the axis of said pole, said first, second and third frame members being sized to provide an opening therein for enabling said rack to be placed on a pole by lateral translation thereof.

References Cited in the file of this patent

UNITED STATES PATENTS

| | | |
|---|---|---|
| 96,773 | Burnham | Nov. 16, 1869 |
| 109,043 | O'Malley | Nov. 8, 1870 |
| 1,017,594 | Roppeneker | Feb. 13, 1912 |
| 1,763,156 | Johnston | June 10, 1930 |
| 1,867,394 | Acly | July 12, 1932 |
| 2,722,634 | Marbury | Nov. 1, 1955 |